United States Patent Office 3,326,830
Patented June 20, 1967

3,326,830
ASPHALT-EPOXY RESIN COMPOSITIONS CURED WITH ACID AMIDES OF PETROLEUM DERIVED ACIDS
Theodore H. Szawlowski, Wonder Lake, and Walter E. Kramer, Niles, Ill., assignors, by mesne assignments, to Union Oil Company of California, Los Angeles, Calif., a corporation of California
No Drawing. Filed Mar. 29, 1963, Ser. No. 269,195
18 Claims. (Cl. 260—28)

This invention relates to new and improved asphalt-epoxy resin formulations suitable for use as paving materials, particularly for the construction of airport runways and automotive highways and other related uses. More particularly the invention relates to a new asphalt-epoxy resin blends comprising (1) liquid aromatic based epoxy resins, (2) low-melting asphalt or asphalt oil, and (3) a curing agent comprising the fluid aminoamide of complex carboxylic acids derived from sulfur-containing aromatic compounds of petroleum origin. More specifically this invention relates to improved paving compositions characterized by the mutual compatibility of ingredients, excellent miscibility, ability to retain greater amounts of asphaltic materials, and by their resistance to hydrocarbon solvents, hardness, durability and heat resistance, comprising about 15% to 60% by weight of epoxy resin, 0% to about 25% by weight of epoxy diluent, about 20% to 70% by weight of asphalt oil and about 10% to 35% of a curing agent comprising the fluid aminoamide of complex carboxylic acids derived from sulfur-containing aromatic compounds of petroleum origin. The amount of said aminoamide (curing agent) is adjusted to establish an excess of about 10% to about 15% over stoichiometric requirements based on the total epoxy equivalents, including the epoxy diluent, when present.

In a preferred embodiment of the invention about 30% to 45% by weight of epoxy resin, about 30% to about 60% by weight of asphalt oil and about 15% to about 30% by weight of said complex aminoamide curing agent are employed. The compositions are characterized by rapid and hard cure at ambient temperatures, and by good adhesion to the aggregate (gravel, crushed stone, sand, etc.) used in paving construction. When solvent resistance to hydrocarbon liquids is required, as in airport runways, garage ramps, service station areas, a relatively thin, finishing layer of epoxy-asphalt resin cured with the complex aminoamides, in which lower asphalt/epoxy ratios, up to about 1/1, are used, can be used successfully as a sealing coat. These sealing coats can also be used in finishing conventional asphalt pavings to impart a hard, solvent-resisting surface at relatively low cost.

Accordingly, it becomes a primary object of this invention to provide improved asphalt-epoxy resin paving formulations.

An object of this invention is to provide a new class of asphalt-epoxy resin paving compositions comprising (1) an epoxy resin, (2) an asphalt oil, and (3) a curing agent comprising the fluid aminoamide of complex carboxylic acids derived from sulfur-containing aromatic compounds of petroleum origin.

Another object of this invention is to provide a new class of asphalt-epoxy resin paving compositions comprising (1) an epoxy resin, (2) an asphalt oil, (3) an epoxy diluent, and (4) the afore-defined complex aminoamide curing agent.

A feature of the invention is to provide improved asphalt-epoxy resin paving compositions cured by the use of aminoamides of complex carboxylic acids derived from sulfur-containing aromatic compounds of the group consisting of (a) solvent extracts from the solvent refining of mineral lubricating oils using a solvent selective for aromatic compounds, (b) hydrogenated solvent extracts, (c) FCC recycle stocks, and (d) decant oil from FCC processing.

Another feature of this invention is the discovery that the asphalt-epoxy resin-complex aminoamide curing agent combination improves the compatibility of the epoxy resin with asphaltic materials, permitting the use of large amounts thereof in the paving compositions.

These and other objects of this invention will be described or become apparent as the specification proceeds.

This invention emanates from a series of copending applications directed to the utilization of solvent extracts, obtained in the solvent refining of mineral lubricating oils, and related materials such as hydrogenated solvent extracts, fractions of solvent extracts, FCC recycle stock and solvent extracts from mineral lubricating oils of various crude sources using different solvents, etc. These copending applications relate to methods for transforming these complex starting materials into carboxylic acids (EPA) and preparing various derivatives of the acids such as esters, polyamides, polyesters, haloacids, alkyd resins, cross-linked resins, styrenated resins, modified epoxy adhesives, corrosion inhibitors, sealing compositions, gear oil additives, synthetic lubricants, caulking compositions, gelling agents and a number of unique and useful derivatives thereof. Because of the complex nature of the starting materials and the derivatives thereof, it is necessary, in order to adequately describe the invention, to set forth a number of physical and chemical characteristics, describe the processes of manufacture, give a sufficient number of examples, and set forth the various processes and compositions and end uses to enable one skilled in the art to understand and reproduce the different inventions. To this end, for purposes of adequate disclosure herein, reference is made to the following copending applications, and their disclosures are hereby incorporated by reference relative to the indicated subject matters:

A complete description of the starting materials, their characteristics, the processes of manufacture, and the characteristics and numerous examples of complex carboxylic acids derived from solvent extracts, hydrogenated solvent extracts, FCC recycle stock and the like is set forth in:

Ser. No. 819, June 12, 1959, T. W. Martinek; Ser. No. 79,661, Dec. 30, 1960, Kramer, Joo, Haines; Ser. No. 160,882, Dec. 20, 1961, Martinek.

A complete and further amplified description of the complex acids, their methods of fractionation, and the properties of selected fractions of primarily monobasic, dibasic and polybasic character is set forth in:

Ser. No. 161,355, Dec. 22, 1961, Joo, Kramer; Ser. No. 209,741 (now abandoned), July 13, 1961, Joo; U.S. Patent 3,180,876, Joo; U.S. Patent 3,180,876, Joo et al.

A complete description of the complex acids, and their reactivity with polyamines, and additional examples of the acids, and fluid aminoamides, polyamides and aminopolyamides prepared, is set forth in:

Ser. No. 79,548, Dec. 30, 1960, Martinek; Ser. No. 114,637, June 5, 1961, Fierce, Weichman; Ser. No. 248,209, Dec. 31, 1962, Earhart, Szawlowski, Kimble; Ser. No. 248,234, Dec. 31, 1962, Fronczak et al.

the latter two copending applications disclosing the preparation and properties of the particular aminoamide curing agents of this invention, the epoxy resins with which they can be used, and the processes of utilization.

The epoxy-asphalt paving compositions of this invention are superior to the epoxy-asphalts of the prior art because the compatibility imparted by the complex aminoamide curing agent eliminates the need for the stabilizers used in the prior art formulations. Also, much higher asphalt/epoxy ratios can be used, thereby greatly reducing the cost of the paving material, while still providing a hard, fast-curing, solvent-resistant paving material. These advantages are obtained without the tendency of the compositions to separate into two phases during curing. The paving compositions of this invention are also resistant to wear, water, freeze-thaw-conditions, buckling, deicing salts and extreme cold.

This invention relates to the discovery that the coating compositions of application Ser. No. 248,234 form excellent paving compositions when modified as described herein. More particularly the invention relates to the use of a new class of chemical compounds comprising the aminoamides of complex carboxylic acids derived from sulfur-containing aromatic hydrocarbons of petroleum origin as curing agents for asphalt-epoxy resin paving compositions wherein said aminoamides are prepared from (1) solvent extracts, obtained in the solvent refining of mineral lubricating oils using a solvent selective for aromatic compounds, (2) hydrogenated solvent extracts and (3) FCC recycle stocks by metalation, carbonation, acidification and reaction with an amine in accordance with application Ser. No. 248,209. Another aspect of this invention is the discovery that the aforedefined aminoamides of complex aromatic acids derived from solvent extracts or FCC recycle stock are superior curing agents for asphalt-resin paving compositions.

As described in said copending applications Ser. Nos. 248,209 and 248,234, the aminoamides used as curing agents are to be distinguished from the aminoamides of ordinary carboxylic acids in that the organic acid portion of the molecule is derived from sulfur-containing aromatic compounds of petroleum origin, exemplified by solvent extracts. Furthermore, the aminoamide curing agents are distinguishable from the modified polyamide resins of the prior art, such as the reaction products of formaldehyde, a dimeric fatty acid containing two carboxyl groups per molecule, and an organic amine, such as an aliphatic triamine. For instance the complex carboxylic aromatic acids or mixture of mono-, di- and polycarboxylic acids derived from solvent extracts have many properties that differ from dimer fatty acids, i.e., a polymerized fatty acid such as polymerized linoleic acid, described in United States Patent 2,956,968 or described in any of the references disclosed therein such as soybean fatty acids, linseed oil fatty acids, cottonseed oil fatty acids and the like. In addition, these aminoamides distinguish over the linear polyamide polymers disclosed in copending application Ser. No. 79,542, filed Dec. 30, 1960, by W. E. Kramer, L. A. Joo and T. H. Szawlowski by two important characteristics:

(a) They are quite fluid at room temperature and thereby readily miscible with epoxy resins,
(b) The chain length is principally made of monomers having two polyamine units and one EPA unit but may include some chains having three polyamines linked by two EPA units.

The aminoamide curing agents have the formula (1) 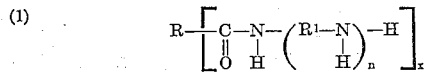

wherein $n$ is an integer of 1 to 10, $R^1$ is a divalent hydrocarbon radical containing 1 to 8 carbon atoms, R is the complex radical derived from solvent extracts and related sulfur-containing aromatic compounds, and $x$ has a value of 1 to 7 and may have a value of 1 to 4, and is preferably 2–4, depending on the number of carboxyl groups in the complex carboxylic acid derived from solvent extracts and related sulfur-containing aromatic starting materials.

When prepared from monocarboxylic acids, the aminoamide curing agents have the formula (2) 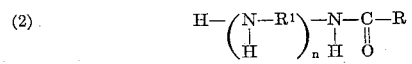

wherein R and $R^1$ are as before defined and $n$ is an integer of 1 to 10, and are prepared from monocarboxylic acids derived from solvent extracts as hereinafter more fully described.

When prepared from dicarboxylic acids, the aminoamide curing agents have the formula (3) 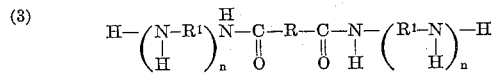

wherein R and $R^1$ are as before defined, $n$ is an integer of 1 to 10 and are derived from dibasic acids prepared from solvent extracts obtained from mineral lubricating oils.

When prepared from tricarboxylic acids, the aminoamide curing agents have the formula (4) 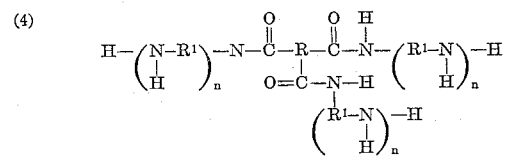

wherein R and $R^1$ are as previously defined, $n$ has a value of 1 to 10, and are derived from tribasic acids prepared from solvent extracts.

This invention results from the discovery that the fluid aminoamides of carboxylic acids derived from solvent extracts obtained in the solvent extraction of mineral lubricating oils using a solvent selective for aromatic compounds, prepared by reacting about one mole of a linear polyamine, such as diethylenetriamine, triethylenetetramine, and tetraethylene pentamine with about one equivalent of polycarboxylic acids from solvent extracts (meaning a mixture of mono-, di-, and polycarboxylic acids or fractions thereof), with incremental addition of said acids to the reaction mixture, with gradually increased temperatures, produces a liquid, non-resinous aminoamide having superior curing properties for epoxy resins in the preparation of asphalt-containing paving materials.

The invention also results from the discovery that the fluid aminoamides so produced are superior to the solid linear polyamides of EPA, to aminoamides of fatty acids or fatty oil acids and are superior to polyamines alone as curing agents for asphalt epoxy paving compositions. In addition, we have discovered that the product is further improved if the mixed polycarboxylic acids are refined to remove all or substantially all of the monocarboxylic acids, and that the curing time of the paving composition can be reduced if the ratio of acid to polyamine is increased slightly to permit a small, controlled polymerization resulting in longer-chain molecules having a structure illustrated by the formula:

(5) 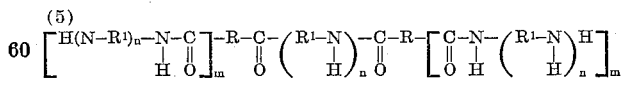

Said discoveries constitute further objects and features of this invention.

THE COMPLEX CARBOXYLIC ACID PORTION OF THE AMINOAMIDE CURING AGENT

The complex carboxylic acids or acid mixtures used in accordance with this invention are prepared in accordance with the processes disclosed in copending applications, Ser. No. 819,932, filed June 12, 1959, by T. W. Martinek, Ser. No. 79,661, filed Dec. 30, 1960, by Messrs. W. E. Kramer, L. A. Joo, and R. M. Haines, and Ser. No. 160,882, filed Dec. 20, 1960, by T. W. Martinek.

These acids are further described in related copending applications, Ser. No. 79,541, filed Dec. 30, 1960, by Messrs. W. E. Kramer and L. A. Joo, Ser. No. 79,506, filed Dec. 30, 1960, by T. W. Martinek.

In accordance with said copending applications, the complex, polynuclear, aromatic, and alkaromatic carboxylic acids used to prepare the novel compositions of this invention are derived by metalation, carbonation, and acidification of a source of complex, polynuclear, aromatic sulfur-containing nuclei as represented by (1) solvent extracts obtained in the solvent refining of mineral lubricating oils using a solvent selective for aromatic compounds, (2) hydrogenated and refined solvent extracts, and (3) FCC recycle stock.

The resulting complex acids, hereinafter referred to as extract acids, or EPA, are mixtures or mono-, di-, and polycarboxylic acids. Through chemical analysis, characterization and study of the physical and chemical properties, by way of illustration only, the extract acids can be represented by the following formulae:

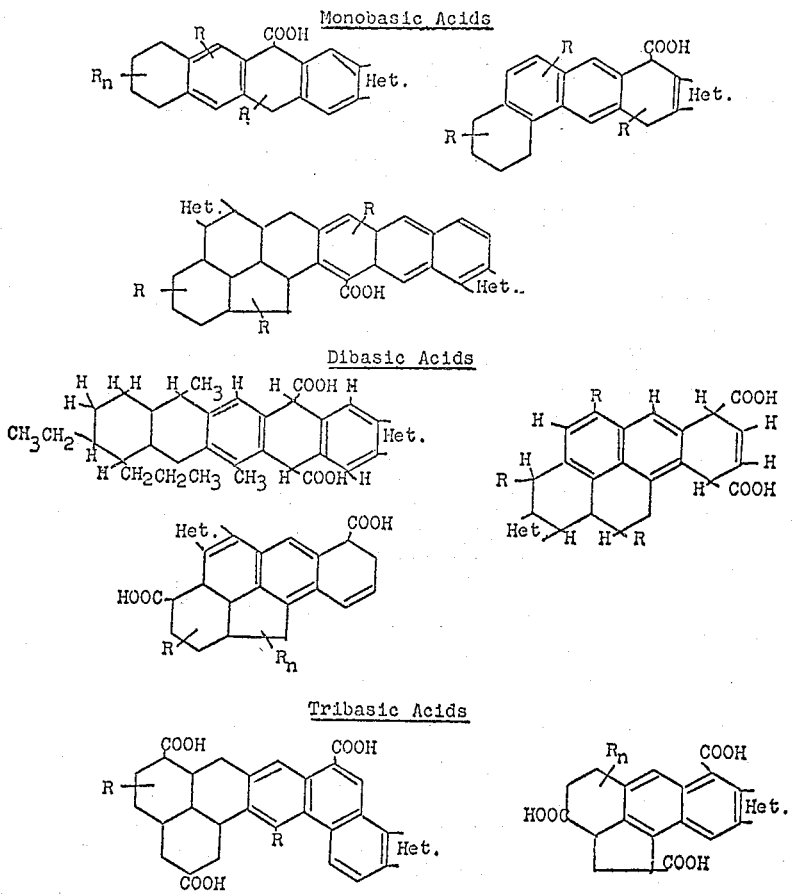

wherein "Het." illustrates one or more S-, or O-containing heterocyclic ring substituents, R is an alkyl or cycloalkyl radical having a total of 5 to 22 carbon atoms for each nucleus and $n$ has a value of 3 to 10. The molecular weight of the extract acids ranges from about 300 to 750, and the average molecular weight is about 325–470. Table I gives representative physical and chemical properties of the extract mono-, di-, and polycarboxylic acids to be used in accordance with this invention.

TABLE I

| Property: | Value |
|---|---|
| Av. mol. wt. range | 325–470 |
| Melting point | 60–100° C. |
| Bromine No. | 4–24 |
| Sulfur, percent | 1.05–4.45 |
| Unsaponifiables, percent | 2–8 |
| Color, deep red-dark brown. | |

In the mixture of acids produced by metalation, carbonation, and acidification of solvent extracts, the monobasic acid derivatives constitute from 5–59% by weight, the dibasic acids constitute from 5–95% by weight and the polybasic acids, that is those acids containing from 3 to as high as 7 carboxyl groups, make up from 0 to 20% by weight. In the preferred embodiment of the invention, the mixture of acids produced by metalation, carbonation, and acidification of solvent extracts from the manufacture of refined mineral lubricating oils may be used although fractions of such acids, such as those prepared by the method of copending applications, Ser. No. 161,355, filed Dec. 22, 1961, Ser. No. 209,741 (now abandoned), filed July 13, 1962, and U.S. Patent 3,180,876, may also be used.

Since the preferred source material, namely solvent extracts from the manufacture of mineral lubricating oil, does not lend itself to economical production of the desired complex acids using the prior art methods, the preferred methods of preparation set forth in said copending applications will be described and the properties of the acids set forth as examples. The details of these processes as described in said copending applications are incorporated herein by reference.

One procedure is to react about 30 parts of a petroleum fraction rich in complex polynuclear aromatics, as exemplified by solvent extract oils, with 1 to 5 parts of an alkali metal, such as sodium, potassium, cesium, lithium, and rubidium, and their mixtures and amalgams, at a temperature of about 60° to 80° C. in the presence of a reaction solvent such as dimethyl glycol ether, dimethyl ether, methylalkyl ethers, dialkyl glycol ethers, tetrahydrofuran, methylal, and trimethylamine. The formation of the adduct is promoted by shearing and agitation, providing an excess of alkali metal, using a pre-formed dispersion of the alkali metal in an inert solvent, or using a preformed dispersion of the alkali metal in a portion or all of the solvent extract. These techniques overcome the induction period of the reaction caused by impurities, including sulfur compounds, present therein, which tend to coat the alkali-metal particles and prevent the reaction or prolong the induction period. A Brookfield counter-rotating stirrer may be used to give continuous shearing and expose fresh metal surfaces during the reaction. Color changes indicate the progress of the reaction.

The alkali-metal adduct thus formed is either separated or left in the unreacted oil, and is treated with excess gaseous or solid carbon dioxide at temperatures ranging from about −20° C. to −80° C., causing a discharge of the color. This forms the alkali-metal salt of the complex acid which, upon acidification with a mineral acid, such as sulfuric, nitric or hydrochloric acids, yields the desired complex, polynuclear, carboxylic acids in good yields. To illustrate, the following non-limiting examples are given.

Example I

One hundred gms. of extract oil No. 19 (Table III) from the preparation of 170 vis., 100 VI neutral oil, dissolved in 675 cc. of dry tetrahydrofuran, was reacted with agitation at 10° to 30° C. with 8.3 gms. of metallic sodium in the form of ³⁄₁₆" cubes. After 25 minutes, adduct-formation began and a strong color change took place. The product was cooled to −60° C. while an excess of carbon dioxide gas was introduced, resulting in a discharge of the color without precipitation. The 5.1 gms. of unreacted sodium was removed, the tetrahydrofuran was vacuum-stripped from the product, and the remaining liquid was combined with ether and water-washed. Acidification of the aqueous phase and further ether washing resulted in the recovery of the free acids. About 11% of the solvent extract had reacted. The acid product had an indicated average molecular weight of 686, a saponification value of 171, and a calculated equivalent weight of 328, indicating an average of 2.1 carboxyl groups per molecule.

Example II

One hundred gms. of extract oil No. 19 (Table III) and 675 ml. of dry tetrahydrofuran were charged to a one-liter, 3-necked flask equipped with a stirrer, thermometer, pressure-equalized drop-funnel, gas inlet with rotometer, and gas outlet. A dry nitrogen atmosphere was maintained in the flask. Approximately 100 gms. of alundum balls, ⁵⁄₁₆" in diameter, were charged and agitation started. The solution was cooled to −20° C. and 8.3 gms. of sodium as a 20% dispersion in toluene were added. After an induction period of about 5 minutes, the solution was warmed, and at −7° C. the reaction began; in 17 minutes it was proceeding rapidly. When the reaction had progressed substantially to completion, an excess of dry carbon dioxide was added at −80° C. over a period of 78 minutes. The reaction mass was worked up as in Example I after the excess sodium was destroyed with water. About 15% of the extract oil reacted, and 22.5 gms. of extract acid were recovered having a saponification value of 241, indicating an equivalent weight of 233. The acid product contained 2.8% sulfur.

Example III

The process of Example II was repeated producing complex acids having a saponification value of 323, an indicated equivalent weight of 173, and an indicated average molecular weight (cryoscopic) of 600, and containing 3.0% sulfur. The ratio of molecular weight to equivalent weight was 3.5 indicating a mixture containing acids with more than two carboxyl groups per molecule on the average.

Example IV

The various recovered acids of application Serial No. 819,932, illustrated in Table II therein, are further examples of mono-, di- and polycarboxylic acids to be used to prepare the aminoamides of this invention.

Example V

The various carboxylic acid products described in Runs 12 through 47 of application Ser. No. 79,661 are further examples of acids that may be used.

In order to further illustrate the complexity and types of modifying acids that can be used in accordance with this invention, the following tabulation is given:

TABLE II.—TYPICAL PROPERTIES OF A NUMBER OF EXAMPLE COMPLEX ACIDS (EPA)

| No. | Sap. Value | Mol. Wt. | Percent S | Br. No. | Percent Unsap. | Eq. Wt. | Eqs./Mol | Acid No. |
|---|---|---|---|---|---|---|---|---|
| 1 | 171 | 686 | | | | 328 | | |
| 3 | 323 | 600 | 3.0 | | | 173 | | |
| 4 | 287 | 750 | 1.85 | | | 195 | 3.8 | |
| 7 | 272 | 940 | 2.07 | | | 206 | 4.6 | |
| 24 | | | 1.9 | 20 | 4.4 | | | 304 |
| 31 | | | 3.2 | 22 | 6.4 | | | 242 |
| 38 | | 390 | | | 9.5 | | | 163 |
| 39 | | 375 | | | 7.4 | | | 200 |
| 40 | | 375 | | | 8.7 | | | 211 |
| 46 | | 390 | | | 4.2 | | | 197 |
| 49 | | 365 | | | 5.4 | | | 218 |
| 51 | | 455 | | | 5.5 | | | 186 |
| 53 | | 385 | | | 2.5 | | | 255 |
| 54 | | 380 | | | 6.4 | | | 216 |
| 60 | | 375 | | | 3.2 | | | 196 |
| 63 | | 345 | | | 4.0 | | | 202 |
| 71 | | | | | 4.2 | | | 233 |
| 8 | | | | | | | | 73 |
| 101 | | 405 | | | 9.0 | | | 168 |
| 102* | | 320 | | | | | | 240 |

*Prepared from decant oil: API gravity 15.4°, RI 1.5425. Acid No. 102 contained about 1.5 carboxyl groups per molecule.

The starting materials for the reaction to prepare the complex acids from which the curing agents are prepared to be used in accordance with the invention may be any complex, polynuclear and/or heterocyclic aromatic hydrocarbon from petroleum sources. A preferred and unique source of aromatic starting material comprises petroleum fractions as herein defined, not only because mono-, di-, and polybasic acid products therefrom have unique properties, but also because the techniques outlined herein are particularly adapted to processing these more complex and resistant source materials. Illustrating the preferred and novel starting materials is the class known as solvent extracts from the manufacture of mineral lubricating oils, which solvent extracts are rich in complex, polynuclear, aryl, alkaryl, condensed ring and heterocyclic nuclei forming the organic portion of the mono-, di-, and polybasic carboxylic acids, or their mixtures, of this invention. Solvent extracts from the manufacture of bright stock and neutral lubricating oils are particular examples of such fractions rich in complex aromatic compounds obtained as by-products from the solvent refining of mineral oils.

For example, a preferred source of the above-defined complex hydrocarbons comprises the solvent extracts obtained in solvent refining mineral oils, particularly lubricating oil fractions using a solvent selective for aromatic compounds. These extracts, hereinafter referred to as solvent extracts, are obtained as the extract or solvent phase when lubricating oils are refined by treatment with said selective solvent having an affinity for the aromatic compounds.

Since the general process of refining mineral lubricating oils in which solvent extracts are obtained is well known, and is related in detail in said copending applications, it is only necessary for present purposes to give some examples by way of illustration. Following are the physical characteristics of typical extract products, from lubricating oil stocks derived from various crude oils and other source hydrocarbon materials, which may be used to prepare the aminoamide curing agents for the paving compositions of this invention and for curing epoxy resins as prepared herein.

TABLE III.—SOURCES AND PHYSICAL CHARACTERISTICS OF SOLVENT EXTRACTS

| Ext. No. | Crude Source | Solvent | API Grav. | Sp. gr. at 10° F. | Vis./100° F. | Vis./130° F. | Vis./210° F. | V.I. | Pour | °F. Flash | °F. Fire | Iodine No. (Wijs) | Percent C.R. | Percent Sulfur |
|---|---|---|---|---|---|---|---|---|---|---|---|---|---|---|
| 1 | East Tex | Phenol | 11.1 | | 23,319 | 4,750 | 282 | −40 | +55 | | | | 7.2 | 2.60 |
| 2 | do | do | 15.4 | | 15,000 | | 285 | +39 | | | | | | |
| 3 | do | do | 12.6 | | 36,410 | 4,310 | 310.1 | −1 | +80 | | | | 4.7 | 2.27 |
| 4 | do | do | 14.6 | | 19,500 | 4,305 | 313 | +27 | +90 | | | | 4.7 | 2.2 |
| 5 | do | do | 15.4 | | 32,500 | | 372 | +5 | +60 | | | | 4.13 | 2.33 |
| 6 | do | do | 13.7 | | 25,000 | 5,400 | 355 | +27 | +80 | | | | | 2.18 |
| 7 | do | do | 8.6 | | 145,000 | 19,000 | 616 | 0 | +70 | | | | | |
| 8 | do | do | 10.5 | | 12,676 | 2,514 | 172.1 | −101 | +60 | | | | | 2.18 |
| 9 | Santa Fe Springs | Phenol | 10.2 | 0.9984 | | | 371 | | +65 | 520 | 600 | 69.4 | | |
| 10 | Texas | Furfural | 13.0 | 0.9791 | | | 1,500 | | +85 | 470 | 515 | 57.4 | | |
| 11 | Penn | Chlorex | 12.2 | 0.9843 | | | 1,365 | | +85 | 560 | 630 | 71.4 | | |
| 12 | Penn | Nitrobenzene | 10.0 | 1.000 | | | 1,500 | | +75 | 555 | 640 | 60 | | |
| 13 | Mid-Cont | Propane cresol | 14.4 | 0.9699 | | | 1,500 | | +100 | 540 | 605 | 63.7 | | |
| 14 | Mid-Cont | Phenol | 13.6 | | | | 41.7 | −82 | +20 | | | | | |
| 15 | Mid-Cont | Chlorex | 13.6 | | | | 200 | −61 | +75 | | | | | |
| 16 | Mid-Cont | Phenol | 8.9 | | | | 569 | | +75 | | | | | |
| 17 | Mid-Cont | Furfural | 14.9 | | | | 50.2 | 25 | +20 | | | | | |
| 18 | East Tex | Phenol | 13.5 | .976 | 25,000 | | 341 | 17 | +65 | 530 | 610 | | 5.76 | 2.36 |
| 19 | do | do | 11.1 | | | | 61.5 | −56 | +40 | 435 | 475 | | 0.42 | 2.7 |
| 20 | do | do | 13.7 | | | | 360 | +25 | +65 | 550 | 630 | | 5.5 | 2.3 |
| 21 | do | do | 7.7 | | | | 71.1 | −128 | +35 | 420 | 495 | | 0.86 | 3.2 |
| 22 | do | do | 7.3 | | | | 796 | −76 | +65 | 520 | 610 | | 7.7 | 3.0 |
| 41 | do | do | 17.6 | | 154 | 80 | 41 | 11 | +30 | 400 | 435 | | 0.1 | 2.0 |
| 42 | do | do | 13.7 | | 26,000 | 5,615 | 360 | +25 | +65 | 550 | 630 | 37.5 | 5.5 | 2.3 |
| 43 | do | do | 11.1 | | 1,054 | 331 | 61.5 | −56 | +40 | 435 | 475 | 40.0 | 0.4 | 2.7 |
| 44 | do | do | 7.7 | | 2,007 | 611 | 796 | −128 | +35 | 420 | 495 | 38.6 | 0.86 | 3.2 |
| 45 | do | do | 7.3 | 1.019 | 230,000 | 20,800 | 796 | −76 | +65 | 520 | 610 | | 7.7 | 3.0 |

Extract No. 41 was obtained in the production of 85 Vis. neutral, has an average molecular weight of 300, and contained 76.8% aromatics (by the silica gel procedure).

Extract No. 42 was obtained in the production of 150 Vis. Bright Stock, has an average molecular weight of 590, contained 86% aromatics, 14% saturates, analyzed 86.2% carbon, 11.4% hydrogen and averaged 3.3 aromatic rings per aromatic molecule.

Extract No. 43 was obtained in the production of 170 Vis. neutral, has an average molecular weight of 340, contained 87.0% aromatics, 13% saturates, analyzed 86.4% carbon, 10.7% hydrogen, and averaged 2.7 aromatic rings per aromatic molecule.

Extract No. 44 was obtained in the production of 200 Vis. neutral, has an average molecular weight of 340 and contained 87% aromatics and 13% saturates.

Extract No. 45 was obtained in the production of 160 Vis. Bright Stock and contained 92% aromatics and 8% saturates.

The solvent extracts from lubricating oils used as starting materials for this invention have the following general properties and characteristics:

TABLE IV

| Characteristic: | Range of value |
|---|---|
| Gravity, °API | 7.3–18.3 |
| Gravity, sp., 60/60° F. | 0.945–1.022 |
| Viscosity, SUS @ 210° F. | 40–1500 |
| Viscosity index | −128 − +39 |
| Pour point (max.), ° F. | +35 − +100 |
| Molecular weight, average (above 300) | 320–750 |
| Boiling point (initial) ° F. | 300–1000 |
| Boiling point (end), ° F. | 400–1200 |
| Sulfur, percent wt. (total) | 0.5–4.5 |
| Sulfur compounds, percent by vol. | 20–50 |
| Aromatic compounds | 25–90 |
| Neutral aromatic hydrocarbons | 40–51 |
| Av. No. of rings/mean arom. mol. | 1.7–5.0 |

In characterizing the complex acids, the aminoamides and the paving compositions of this invention, the molecular weights, sulfur content and average number of aromatic rings per mean aromatic molecule of the complex acids are the selected criterion.

The complexity of the types of compounds present, as based on these analysis, is illustrated by the following table:

TABLE V.—ESTIMATED CHEMICAL COMPOSITION OF SOLVENT EXTRACTS NOS. 19, 21, 43 AND 44 OF TABLE III

| Type of Compound: | Approx. percent in the extract |
|---|---|
| Saturated hydrocarbons | 12.5 |
| Mononuclear aromatics— | |
| Substituted benzenes | 25.0 |
| Dinuclear aromatics— | |
| Substituted naphthalenes | 30.0 |
| Trinuclear aromatics— | |
| Substituted phenanthrenes | 10.0 |
| Substituted anthracenes | 5.0 |

TABLE V—Continued

| Type of compound: | Approx. percent in the extract |
|---|---|
| Tetranuclear aromatics— | |
| Substituted chrysenes | 00.5 |
| Substituted benzphenanthrenes | 0.2 |
| Substituted pyrenes | 0.2 |
| Pentanuclear aromatics— | |
| Perylene | 0.01 |
| Sulfur compounds [1], oxygen compounds, etc. | 16.5 |

[1] Mainly heterocyclic compounds. The average mol. wt. of Extracts 19 and 21 is 340, and that of Extract 20 is 590.

Any portion of the reactive aromatic constituents in solvent extracts may be isolated therefrom, or from other sources, to be used as starting materials for the reaction in accordance with this invention. For example, solvent extracts may be distilled and selected fractions thereof used as the starting materials. The content of reactive, complex, polynuclear, aromatic compounds and heterocyclics present in solvent extracts as, illustrating the preferred source material, may vary depending on the type of solvent, the extraction process applied, and the mineral oil treated although the general types of compounds present in the extract are not so varied. Extracts containing from about 30% to 90% of polynuclear aromatics and heterocyclics of aromatic nature represent a preferred type of starting material for economic reasons.

The solvent extract starting material may be vacuum-distilled, dewaxed and/or clay-contacted and/or hydrogenated prior to use in preparing the complex carboxylic acids from which the selected fractions used in accordance with this invention are derived. Dewaxing can be accomplished by known methods, e.g., treatment with 45% MEK and 55% toluene as the dewaxing solvent, using temperatures in the order of −10° F., and solvent/solvent extract ratios of about 8/1. This treatment results in a dewaxed extract which has a pour point of +5° F. and results in the removal of about 2% wax having a melting point of about 130° F. Clay-contacting can be accomplished by known methods.

The preparation of hydrogenated extracts is accomplished using known methods of hydrogenation, particularly mild hydrogenation; thus a preferred method of preparing hydrogenated extracts is to hydrogenate the distillate lube oil or residual oil before the extraction by treatment with hydrogen at 100–50 p.s.i.g. using temperatures of 530–600° F. in the presence of a molybdena-silica-alumina catalyst. This same method can be applied to the solvent extracts per se, that is after the separation from the raffinate.

Hydrogenation has been found to result in the decarboxylation of any naphthenic acids present and the production of an extract from which complex acids of enhanced properties can be obtained by metalation, carbonation, acidification and fractionation.

Other known methods of hydrogenation can be applied to the solvent extracts using such catalysts as Filtrol, cobalt-molybdate, silver-molybdate and Porocel. The characteristics of a representative hydrogenated dewaxed and clay-contacted solvent extract are °API, 9.5; color, NPA, 7; flash (COC), 420° F.; fire (COC), 465° F.; pour point, −5° F.; vis. @ 100° F., 1075 SUS; vis. @ 210° F., 58.5 SUS; VI, −96; neut. No., (1948), 0.05; sulfur, 2.60 wt. percent and C.R. percent, 0.01. The FCC recycle stock is illustrated by the 19% extract (phenol solvent) of FCC recycle stock, which extract had the following properties: °API, 1.8; sulfur, 1.9 wt. percent; Br. No., 17; RI (20° C.) 1.6372 and Engler distillation, −IBP=589° F.; 90%−745° F. The use of these latter starting materials is described in copending application Ser. No. 79,661.

The preparation and properties of FCC recycle stock and FCC decant oil are described in detail in copending application Ser. No. 242,076, filed Dec. 4, 1962.

For example a typical FCC decant oil is one having an API gravity of 15.4°, IBP 375° F. and EP 995° F. at atmospheric pressure, CS vis. @ 100° F. 21.00, CS vis. @ 210° F. 3.66, percent S 0.870, Ramsbottom C 1.70, mol. wt. 320, vis. gr. con. .945, Br. No. 8.0. The 47 vol. percent extract from this decant oil has a specific gravity of 1.095, exhibits the same initial boiling point and end boiling point and has the following characteristics: CS vis. @ 100° F. 223.5, CS vis @ 210° F. 7.80, percent S 1.44, Ramsbottom C 5.7, vis. gr. con. 1.103, Br. No. 14.0, which is another species of the starting material. The results of hydrogenation of several of the solvent extracts shown in Table III, to produce hydrogenated or dewaxed and hydrogenated solvent extracts for use in acid preparation and subsequent conversion to aminoamides, are shown in Table VI.

Table VI also sets forth the range of conditions and product properties that are generally applicable to the process and product starting materials of this invention.

Without limiting the invention, the characteristics of the products of this invention as influenced by the complex acids are further disclosed as thus far evaluated. The mono-, di- and polycarboxylic acids used are mixtures of acids of the dihydronaphthalene, dihydrophenanthrene, and dihydroanthracene types, having several alkyl groups and/or cycloalkyl groups in each aromatic nucleus wherein the sum of the carbon atoms in the alkyl or naphthenic radical varies between 5 to 22. Despite the size of the acid molecules the linkages through or between the carboxyl groups are about the same as those of phthalic and terephthalic acids. A portion of the aromatic rings or condensed aromatic rings are probably further condensed with naphthenic rings to form configurations similar to the steroid ring systems. Extract acids from solvent extracts obtained in the production of bright stocks probably contain more highly condensed aromatic structures. Most of the sulfur is in the form of heterocyclic rings with carbon associated with both the aromatic-type and naphthenic-type structures present. Only trace amounts of the sulfur are present as high-molecular-weight aliphatic sulfides. The nitrogen content of distilled solvent extracts is 0.01 to 0.04%. Analysis for the types of carbon linkages as percent $C_a$ (carbon atoms in aromatic configuration) percent $C_n$ (carbon atoms in naphthenic configuration) and percent $C_p$ (carbon atoms in paraffinic configuration) gives results ranging from about 30–40% $C_a$, 20–35% $C_n$, and 31–47% $C_p$ using the method of Kurtz, King, Stout, Partikian and Skrabek (Anal., Chem., 28, 1928 (1956)). They are soluble in ethyl ether, acetone, methyl ethyl ketone, tetrahydrofuran, benzene, toluene and xylene.

In one aspect of the invention aminoamides are prepared having enhanced curing properties by reacting a polyamine, as herein defined, with a mixture of complex carboxylic acids from which the monocarboxylic acids have been removed. The exclusion of the monobasic acids to produce fractions comprising the balance of the mixed acids or fractions predominantly dicarboxylic, tricarboxylic or tetracarboxylic, as the case may be is accomplished by means of fractionation. The detailed procedures for carrying out the fractionation of the mixed acids is described in detail in the copending applications.

Ser. No. 161,355, Dec. 22, 1961, L. A. Joo et al.;
Ser. No. 209,741 (now abandoned), July 13, 1962, L. A. Joo; U.S. Patent 3,180,876, Dec. 4, 1962, L. A. Joo;

TABLE VI.—HYDROGENATION OF SOLVENT EXTRACTS AND PRODUCTS

| | Run No. | | | | | | | | | Range of Conditions and Product Properties |
|---|---|---|---|---|---|---|---|---|---|---|
| | 1 | 2 | 3 | 4 | 5 | 6 | 7 | 8 | 9 | |
| Reaction Conditions: | | | | | | | | | | |
| Extract No | 43 | 44 | 44 | 44 | 41 | 43 | [1] 43 | 44 | [1] 43 | |
| H/HC ratio | 2.0 | 2.0 | 2.5 | 2.5 | 1.75 | 1.03 | 2.0 | 2.0 | 2.02 | 1.0–2.5 |
| LVHSV | 2.15 | 2.05 | 2.0 | 1.95 | 2.0 | 2.0 | 2.0 | 1.97 | 2.0 | 1.9–2.5 |
| Temp., °F | 700 | 700 | 650 | 650 | 650 | 675 | 700 | 700 | 720 | 650–720 |
| Pressure, p.s.i.g | 500 | 500 | 400 | 300 | 400 | 400 | 500 | 500 | 500 | 300–500 |
| Catalyst | ([1]) | ([1]) | ([1]) | ([1]) | ([1]) | ([1]) | ([1]) | ([1]) | ([2]) | ([2]) |
| Products: | | | | | | | | | | |
| Neut. No | 0.13 | 0.14 | 0.52 | 0.96 | 0.11 | 0.66 | 0.24 | 0.08 | 0.15 | .08–1.0 |
| Sulfur (wt. percent) | 2.4 | 3.19 | 3.07 | 3.05 | 1.75 | 2.7 | 2.6 | 2.7 | 2.7 | 1.5–3.5 |
| Grav., °API | 12.8 | 9.4 | 8.5 | 8.8 | 18.5 | 11.8 | 12.9 | 10.1 | 9.7 | 8.0–15.0 |
| Vis. at 100° F | 663.7 | 1133 | 1457 | 1452 | 132.5 | 808.7 | 851.1 | 464 | 1058 | 450–1500 |
| VI | −33 | −96 | −115 | −114 | −9 | −49 | −52 | −83 | −96 | −120 to −9 |

[1] Dewaxed.   [2] Filtrol.

U.S. Patent 3,180,876, Dec. 4, 1962, L. A. Joo et al. In accordance with application Ser. No. 161,355 fractions of the complex acids are separated in accordance with their acid numbers and the number of carboxyl groups per molecule by (1) dissolving the salts of the acids to be fractionated in a first solvent in which the free acids are at most only sparingly soluble; (2) adding a small amount of an acid sufficiently strong to decompose the salts and liberate a portion of the desired acids; (3) extracting the liberated acids from the resulting mixture using a second solvent which is immiscible with said first solvent; (4) adding another small amount of mineral acid to the remaining salt solution; (5) again extracting the acids thus liberated with said solvent; and (6) continuing this cyclic acidification and extraction until the first solvent is substantially free of the desired acids and their salts. The process is illustrated as follows:

*Example VI*

A water solution containing 26 g. of the sodium salts of "extract acids" per 100 ml. was prepared, a 150-ml. portion of it was treated with 1 ml. of hydrochloric acid, and the resulting liberated acid was extracted with 20 ml. of toluene (Fraction 1, Table VII). Then the acidification with hydrochloric acid and the extraction were repeated in cyclic fashion, until no more acid was obtained from the water phase. After the "extract acid" had reached an acid number of 220 (Fraction 6, Table VII), the extraction solvent was changed to ether, since the higher-acid-number acids are insoluble in toluene. The results of the procedure are given in Table VII.

TABLE VII

Original "extract acid":
A.N. _____ 218
Mol. wt. _____ 420
Percent Unsap. _____ 8.7
—COOH/mol. _____ 1.66

| Fraction No. | Amount (g.) | Acid No. | Mol. Wt. | —COOH/Mol |
|---|---|---|---|---|
| 1 | 4.84 | 77 | 424 | 0.60 |
| 2 | 5.53 | 119 | | |
| 3 | 4.81 | 122 | 400 | 0.80 |
| 4 | 4.59 | 107 | | |
| 5 | 5.46 | 163 | 400 | 1.40 |
| 6 | 2.08 | 217 | | |
| 7 | 1.62 | 298 | 400 | 2.10 |
| 8 | 0.70 | 282 | | |
| 9 | 1.33 | 342 | 390 | 2.20 |
| 10 | 1.52 | 344 | | |
| 11 | 2.18 | 389 | 385 | 2.80 |
| 12 | 0.28 | 403 | | |

*Example VII*

In this example, the same stock solution was used as in Example VI, but ether was used as the extraction solvent from the beginning. First, 150-ml. portion of the "extract acid" salt solution was extracted with 20 ml. of ether. Then 5 ml. of concentrated hydrochloric acid and 10 ml. of water were added to the ether solution and the resulting acidic water phase was separated from the ether phase, containing "free extract acid," and combined with the raffinate phase from the previous ether extraction step. After the water phases had been combined, they were extracted again with ether, the ether solution was acidified with 1 ml. of concentrated hydrochloric acid and 10 ml. of water, and the water phase was again separated from the ether phase, again containing "extract acid," and combined with the stock solution. This procedure was repeated until no more acid was obtained from the extract-acid-salt water solution when the solution was acidified.

The ether phases were washed twice with 10-ml. portions of water, and then the ether was evaporated to leave the acid fractions as products. These acid fractions had higher acid numbers than the fractions obtained by the method used in Example VI, indicating that some acid salt had been extracted along with the acids in Example VI. The results of this method are given in Table VIII.

TABLE VIII

Original "extract acid":
A.N. _____ 218
Mol. wt. _____ 420
Percent unsap. _____ 8.7
—COOH/mol. _____ 1.66

| Fraction No. | Amount (g.) | Acid No. | Mol. Wt. | —COOH/Mol |
|---|---|---|---|---|
| 1 | 0.99 | 39 | 475 | 0.33 |
| 2 | 2.72 | 104 | | |
| 3 | 3.72 | 128 | 405 | 0.92 |
| 4 | 3.96 | 143 | | |
| 5 | 3.66 | 152 | 400 | 1.10 |
| 6 | 3.07 | 157 | | |
| 7 | 3.07 | 161 | | |
| 8 | 2.81 | 175 | 400 | 1.25 |
| 9 | 2.62 | 167 | | |
| 10 | 3.09 | 195 | 440 | 1.50 |
| 11 | 2.37 | 191 | | |
| 12 | 2.89 | 247 | 415 | 1.83 |
| 13 | 2.46 | 271 | | |
| 14 | 2.47 | 285 | | |
| 15 | 2.20 | 325 | 400 | 2.30 |
| 16 | 2.12 | 408 | 430 | 3.13 |
| 17 | 0.45 | 406 | | |

Fractions 7 through 12 of Table VII, and fractions 12 through 17 of Table VIII are illustrative of species of substantially dicarboxylic acids that can be used in accordance with this invention.

The desired fractions of mixed complex carboxylic acids are prepared in accordance with application Ser. No. 209,741 (now abandoned) by (1) dissolving the free acid mixture to be fractionated in a first solvent in which the mixture is readily soluble; (2) adding a small amount of an aliphatic solvent to precipitate or liberate a portion of the desired acids; (3) filtering the liberated acids from the resulting mixture; (4) adding another small amount of said aliphatic solvent to the remaining acid mixture solution; (5) again filtering the acids thus liberated; and (6) continuing this cyclic precipitation and filtration until the solute consists primarily of monobasic acids and the desired di-, tri-, and tetracarboxylic acids have been separated. Illustrative examples from application Ser. No. 209,741 (now abandoned) are given as follows:

*Example VIII*

A 40.0 g. portion of extract polybasic acids (EPA) having an acid number of 214, a molecular weight of 410, and 4.8% unsaponifiables, was dissolved in 100 ml. of toluene. To this solution, 70 ml. of n-heptane was added. The resulting precipitate was filtered, washed with pentane, and dried, and the dried precipitate was designated as Fraction 1. This procedure was repeated with additional 25, 30, 35 and 40 ml. portions of n-heptane to yield, respectively, Fractions 2, 3, 4, and 5, which are examples of predominantly dibasic acids to be used in accordance with one aspect of this invention. Beyond this point, it was not possible to recover crystalline precipitates of high acid number. The characterization of the fractions is presented in the tabulation immediately below:

TABLE IX

| Fraction No. | Heptane Used (ml.) | Amount (g.) | Acid No. | Molecular Weight | —COOH/Molecule | Percent Unsap. |
|---|---|---|---|---|---|---|
| Charge | | 40.0 | 214 | 410 | 1.57 | 4.8 |
| 1 | 70 | 1.48 | 305 | | | |
| 2 | 25 | 1.65 | 296 | 410 | 2.16 | |
| 3 | 30 | 2.66 | 292 | | | |
| 4 | 35 | 2.00 | 285 | 420 | 2.13 | |
| 5 | 40 | 1.67 | 258 | | | |

Example IX

An 80.0 g. portion of the same extract polybasic acid used in Example VIII was dissolved in 150 ml. of toluene, and 20 ml. aliquots of this solution were precipitated with different amounts of n-heptane. The resulting precipitates were individually filtered, washed, and dried. The solute remaining in each filtrate was recovered by distilling off the mixed toluene-heptane solvent. The fractions so derived were characterized as follows:

TABLE X

| Fraction No. | Amount of n-Heptane Used, (ml.) | Precipitate | | | | Filtrate | | | |
|---|---|---|---|---|---|---|---|---|---|
| | | g. | Acid No. | Mol. Wt. | —COOH/Mol. | g. | Acid No. | Mol. Wt. | —COOH/Mol. |
| (Charge) | | | 214 | 410 | 1.57 | | | | |
| 1 | 15 | 0.82 | 300 | 435 | 2.33 | 6.17 | 193 | 420 | 1.44 |
| 2 | 30 | 2.04 | 290 | | | 5.11 | 182 | | |
| 3 | 45 | 2.48 | 292 | 425 | 2.21 | 4.78 | 174 | 415 | 1.29 |
| 4 | 75 | 3.00 | 289 | | | 4.22 | 157 | | |
| 5 | 125 | 3.12 | 287 | 420 | 2.14 | 4.14 | 156 | 415 | 1.15 |
| 6 | 250 | 3.18 | 286 | | | 4.22 | 153 | | |

Example X

Different concentrations of the acid mixture used in Example VIII above were prepared in toluene, and each was precipitated with a fixed amount of n-heptane. The tabulation below reports the results of these experiments.

TABLE XI

| Fraction Number | EPA/Toluene (g./ml.) | n-Heptane Added (ml.) | Acid No. of Precipitate |
|---|---|---|---|
| (Charge) | | | 214 |
| 1 | 2.7/10 | 250 | 286 |
| 2 | 5.3/10 | 250 | 286 |
| 3 | 8.0/10 | 250 | 287 |

Filtrate fraction numbers 1 through 6 and, particularly filtrate fraction numbers 4, 5 and 6 of Table X and fractions 1, 2 and 3 of Table XI represent illustrative species of other complex acids to be used in accordance with this invention.

In accordance with application U.S. Patent 3,180,876 selected fractions of the carboxylic acids are obtained by (1) dissolving a given amount of the complex mixture of acids to be fractionated in a critical amount of a first aromatic solvent other than benzene in which the free acids are fairly soluble; (2) adding a small and preselected amount of a second aromatic solvent which causes the precipitation of high acid-number polybasic acid as the first portion of the desired acids; (3) separating the liberated acids from the resulting mixture; (4) adding another selected or small amount of the second aromatic solvent to the remaining solution; (5) again separating the acids thus liberated or precipitated; and (6) continuing this cyclic addition of incremental amounts of said second solvent and subsequent separation until the first solvent is substantially free of the desired acids. In this process the second solvent may be the same as the first solvent and precipitation takes place by adding a small and preselected amount of the same, first solvent. This is demonstrated by the following example.

Example XI

A 10.8 g. portion of extract polybasic acid, having an acid number of 218 and a molecular weight of 410, was dissolved in 22 ml. of toluene. The solution was cloudy until more than 4 g. of acid was dissolved. The final solution was clear. Then a 250-ml. portion of toluene was added to the solution, resulting in the development of cloudiness within 5 minutes and a coagulated precipitate within one-half hour. The precipitate was separated by filtration, washed with pentane, and dried, and the dried precipitate was designated as Fraction 1.

A 350-ml. portion of toluene was added to the filtrate resulting in a second precipitate which was separated, washed, dried, and designated as Fraction 2.

A 500-ml. portion of toluene was added to the filtrate, resulting in a third precipitate which was separated, washed, dried, and designated as Fraction 3.

Addition of 1000 ml. of toluene to filtrate resulted in no more precipitation.

The tabulation below provides a summary of characterizations of the fractions produced in this experiment.

TABLE XII

| Fraction Number | Amount (g.) | Acid No. | Molecular Weight | —COOH/Mol. | Percent Unsap. |
|---|---|---|---|---|---|
| (Charge) | 10.8 | 218 | 410 | 1.60 | 5.1 |
| 1 | 0.30 | 307 | 420 | 2.30 | |
| 2 | 0.13 | 295 | 420 | 2.21 | |
| 3 | 0.10 | 288 | 410 | 2.10 | |

Fractions 1, 2 and 3 of Table XII are additional special fractions of dicarboxylic acids to be used in accordance with this invention.

The lower phase portions of predominantly di- and tri-basic complex acids to be used to prepare the liquid aminoamide curing agents in compounding the paving compositions of this invention are described in detail in copending applications Ser. Nos. 248,234, 248,209 and U.S. Patent 3,180,876. These acids are separated by dissolving the pulverized acids in an aqueous alkaline solution containing an organic solven such as ether, shaking the mixture and adding a saturated inorganic salt solution, followed by shaking the mixture and allowing it to settle. The mixture separates into three distinct phases, the lower phase of which contains amber colored, crystalline di-, tri- and higher polybasic acids having acid numbers of about 200 to 300. The predominantly dibasic acid fractions of the complex acids derived from sulfur-containing aromatic compounds of petroleum origin, as herein described, will preferably have acid numbers ranging from about 250 to 330 and a relatively pure dibasic acid fraction prepared from solvent extracts will have an acid number of about 280. These acids are otherwise characterized by the number of aromatic rings per mean aromatic molecule and the content of combined sulfur, to constitute preferred fractions for preparing the liquid aminoamide curing agents used to prepare the paving compositions of this invention.

The lower-phase fractions of predominantly di- and tri-basic acids separated in accordance with copending application Ser. No. 248,234 as described by the following examples can also be used to prepare the liquid aminoamide curing agents of this invention.

Example XII

A 2.17 g. portion of an extract polybasic acid was pulverized and dissolved in 60 ml. of water containing 2.39 g. NaOH and 10 ml. ether. This mixture was poured into a separatory funnel containing 60 ml. additional ether, and shaken vigorously. Then, 10.2 ml. of saturated NaCl solution (containing 2.96 g. NaCl) was added, and the mixture was shaken vigorously for 2 minutes. After settling, a three-phase system emerged: a light-yellow, upper phase, consisting of unsaponifiables in ether; a dark-brown middle phase, consisting of sodium salts of monobasic acids (including naphthenic acids) dissolved in ether-water mixture; a lower phase containing a water solution of sodium salts of di-, tri- and higher polybasic acids. Then, the phases were separated and acidified separately with HCl, and the organic acids released were extracted with ether. Finally, each ether extract was dried, yielding the products in the tabulation below:

Example XIV

A 3.22 portion of extract polybasic acid was pulverized and dissolved in 100 ml. of water containing 3.3 g. of NaOH and 10 ml. of ether, this mixture was poured into a separatory funnel containing 100 ml. additional ether, and the funnel was shaken vigorously. Then, 20 ml. of saturated NaCl solution (containing 5.7 g. of NaCl) was added and the mixture was shaken vigorously for 2 minutes. After settling, a three phase system emerged: a light yellow upper phase consisting of unsaponifiables in ether; a dark brown middle phase consisting of sodium salts of monobasic acids (including naphthenic acids) dissolved in ether-water mixture; a lower phase containing a water

TABLE XIII

| | Original Charge | Fractional Products From— | | |
|---|---|---|---|---|
| | | Upper phase | Middle phase | Lower phase |
| Wt. (g.) | 2.17 | 0.16 | 1.03 | 0.98. |
| Percent of charge | 100 | 7.3 | 47.5 | 45.2. |
| Acid No. | 218 | 37 | 160 | 245. |
| Equivalent wt. | 257 | | 351 | 229. |
| Appearance | Dark brown, crystalline | Yellow, soft solid | Very dark brown gummy prod. | Amber color, crystalline. |
| Essential composition | Mix. of mono-, di-, tri- and higher polybasic acids. | Unsap. | Monobasic acids, incl. naphthenic acids. | Di-, tri-, and higher polybasic acids. |

Example XIII

A 13.43 g. portion of an extract polybasic acid was pulverized and dissolved in 250 ml. of water containing 9.45 g. NaOH and 25 ml. of ether. This mixture was poured into a separatory funnel containing 100 ml. additional ether and shaken vigorously. Then 62 ml. of saturated NaCl solution (containing 17.7 g. of NaCl) was added and the mixture was shaken vigorously for two minutes. After settling, a three-phase system emerged: a light yellow upper phase consisting of unsaponifiables in ether; dark brown middle phase consisting of sodium salts of monobasic acids (including naphthenic acids) dissolved in ether-water mixture; a lower phase containing a water solution of sodium salts of di-, tri-, and higher polybasic acids. The phases were separated and acidified separately with HCl, and the organic acids released were extracted with ether. Each ether extract was dried, yielding the products described below:

solution of sodium salts of di-, tri-, and higher polybasic acids. Each phase was separated and acidified separately with HCl, and the organic acids released were extracted with ether. Finally each ether extract was dried, yielding the products described below:

TABLE XV

| | Original Charge | Fractional Products From— | | |
|---|---|---|---|---|
| | | Upper phase | Middle phase | Lower phase |
| Wt. (g.) | 3.22 | 0.12 | 2.10 | 1.00. |
| Percent of charge | 100 | 3.7 | 65.2 | 31.1. |
| Acid No. of fraction | 218 | 22 | 175 | 296. |
| Equivalent wt. | 257 | | 321 | 190. |
| Appearance | Dk. brown color, crystalline | Yellow, soft solid. | Very da. brown soft, gum. product. | Amber color, crystalline. |
| Essential composition | Mixture of mono-, di-, tri-, and higher polybasic acids. | Unsap. color bodies | Monobasic acids (incl. naphthenic acids). | Di-, tri-, and higher polybasic acids. |

Example XV

An 0.84 g. portion of extract polybasic acid was pulverized and dissolved in 30 ml. of water containing 0.93 g. of NaOH and 5 ml. of ether, this mixture was poured into a separatory funnel containing 30 ml. additional ether, and the funnel was shaken vigorously. Then, 6 ml. of saturated NaCl solution (containing 1.7 g. of NaCl) was added, and the mixture was shaken vigorously for two minutes. After settling, a three-phase system emerged: a light yellow upper phase consisting of unsaponifiables in ether; a dark brown middle phase consisting of sodium salts of monobasic acids (including

TABLE XIV

| | Original Charge | Fractional Products From— | | |
|---|---|---|---|---|
| | | Upper phase | Middle phase | Lower phase |
| Wt. (g.) | 13.43 | 0.44 | 9.21 | 3.78. |
| Percent of Charge | 100 | 3.3 | 68.6 | 28.1. |
| Acid No. of frac. | 218 | 18 | 178 | 309. |
| Equivalent wt. | 257 | | 315 | 181. |
| Appearance | Dark brown color, crystalline | Yellow color, soft solid. | Very dk. brown, soft gum. product. | Amber color, crystalline. |
| Essential composition | Mixture of mono-, di-, tri-, and higher polybasic acids. | Unsap. color bodies. | Monobasic acids (incl. naphthenic acids). | Di-, tri-, and higher polybasic acids. | naphthenic acids) dissolved in ether-water mixture; a lower phase containing a water solution of sodium salts of di-, tri-, and higher polybasic acids, phases were separated and acidified individually with HCl, and the organic acids thus released were extracted with ether. Each ether extract was dried, yielding the products described below:

TABLE XVI

| Original Charge | | Fractional Products From— | | |
|---|---|---|---|---|
| | | Upper phase | Middle phase | Lower phase |
| Wt. (g.) | 0.84 | 0.10 | 0.40 | 0.34. |
| Percent of charge | 100 | 11.9 | 47.6 | 40.5. |
| Acid charge | 263 | 39 | 166 | 295. |
| Equivalent weight | 213 | | 338 | 190. |
| Appearance | Dk. brown color, crystalline | Yellow color | Very dk. brown; soft, gum. product. | Amber color, crystalline. |
| Essential composition | Mixture of di-, tri- and higher polybasic acids and unsap. | Unsap. and color bodies. | Monobasic acids, incl.naphthenic acids. | Di-, tri-, and higher polybasic acids. |

*Example XVI*

A 6.1 g. portion of extract polybasic acid, having an acid number of 206, was dissolved in 200 ml. of tetrahydrofuran and neutralized with a calculated amount of sodium hydroxide (0.89 g.) in 200 ml. of water. There was no separation of phases. Addition of a considerable amount of sodium chloride resulted in a separation of layers. Phases were then separated and independently acidified. Each acidified product was extracted with ether and the extract stripped. The two products were characterized as follows:

TABLE XVII

| Original Charge | | Fractional Products From— | |
|---|---|---|---|
| | | Upper Layer | Lower Layer |
| Wt. (g.) | 6.1 | 3.3 | 2.8. |
| Percent of Charge | 100 | 54 | 46. |
| Acid number | 206 | 150 | 230. |
| Equivalent wt. | 272 | 374 | 244. |
| Appearance | Dk. brown | Gray | |
| Essential composition | Mixture of mono-, di-, tri- and higher polybasic acids and unsap. | Monobasic acids and unsap. | Di-, tri-, and higher polybasic acids. |

THE LIQUID AMINOAMIDES

The aminoamides curing agents are prepared by reacting about one mole of a polyamine with one equivalent of said complex carboxylic acids using the "fusion cook" or the "solvent method." The fusion cook is the preferred method. Preferably, the complex carboxylic acid or fraction thereof is added incrementally to the total polyamine reaction mixture to assure that only one of the two terminal primary amine groups of the polyamine will react. After the monoamine-salt-forming reaction is completed at low temperature, the temperature is gradually raised to cause the amine salt to condense with the acid, giving off water as by-product and yielding the aminoamide product.

The amines used in the reaction have the formula (1) 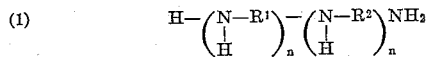

wherein $R^1$ and $R^2$ are the same or different alkylene, cycloalkylene, alkarylene, arylene, and/or aralkylene radicals having 2 to 20 carbon atoms, and including those amines where in both $R^1$ and $R^2$ are arylene or alkarylene radicals connected to the amino nitrogen through nuclear carbon atoms, and $n$ is an integer of 1 to 10 inclusive. Where the amino nitrogen is connected to two arylene groups through nuclear carbon atoms the amino group is inactivated as far as cross-linking is concerned, but the aminoamide so formed is within the intended scope of this invention. Examples of polyamines which can be used are: diethylenetriamine (DETA), triethylenetetramine (TETA), tetraethylenepentamine (TEPA), ethylenediamine (EDA), dipropylenetriamine, tripropylenetetramine, tetrapropylenepentamine, propylenediamine, dibutylenetriamine, tributylenetetramine, tetrabutylenepentamine dipentylenetriamine, tripentylenetetramine, butylenediamine, 1,3-diaminobutane, pentamethylenediamine, hexamethylenediamine, decamethylenediamine, tridecamethylenediamine, naphthylenediamines, octadecamethylenediamine, p-xylylenediamine, cyclohexylenediamine, 4,4' - methylene - bis - aniline, 3 - methylhexamethylenediamine, octamethylenediamine, m-phenylenediamine, o-phenylenediamine, melamine, 3,3'-iminobispropylamine, N-ethyltriaminobenzene, N-propyltriaminobenzene, N-butyltriaminobenzene, N-N'-diethyltriaminobenzene, N-N'-dipropyltriaminobenzene, N-N'-dibutyltriaminobenzene where R and/or $R^1$ in the formula supra are arylene, such groups as phenylene, naphthylene and anthrylene are intended. When R is alkylene such groups as methylene, ethylene, propylene, etc., up to eicosylene are intended and the alkarylene groups may be combinations of the alkyl and aryl groups. Other examples of polyamines are known in the art.

Where the amine contains both primary and secondary amino groups, by proper control of the reaction temperature during monoamine salt formation followed by a higher amide-reaction temperature, and of the mol ratio of complex carboxylic acid to amine in the reaction mixture, the reaction can be controlled so that substantially only one of the two terminal, primary amine groups reacts with each carboxyl group of the acid. This is accomplished by using a ratio of polyamine to acid so that the ratio of the number of primary amine groups to the number of carboxyl groups is at least 2 to 1 to as low as 2 to 1.2, and by carrying out the salt-forming reaction at a low temperature, and the monoamide reaction at a higher temperature, using $N_2$ gas bubbling through the mixture to remove the water formed during the amide reaction (the "fusion cook"). The "solvent cook" method, using an azeotrope to remove water of reaction, can be used, but the reaction is difficult to stop at the point where the aminoamide formation is complete, because the higher temperature needed to remove the azeotrope may cause undesirable reactions.

The mol ratios of polyamine to acid are arranged so that all or substantially all of the carboxyl groups are reacted with one of two available primary amino groups to form an aminoamide.

In the "solvent cook" procedure the polyamine and complex carboxylic acid are first reacted at low temperature (80°–95° C.) to form the monoamine salts using a small quantity of a suitable solvent, such as xylene or toluene. The second step, formation of aminoamide, takes place at temperatures between about 150° and 235° C. and the xylene-water azeotrope is distilled off and xylene recycled to remove more water. When the reaction is completed, the xylene must be distilled off which requires raising the temperature higher than is desirable. Other solvents that are useful are octane, dibutylether, mesitylene, decane and diamylether.

In the "fusion cook" process the total polyamine charge is heated in a reaction vessel at 85–130° C. while adding small increments of extract polycarboxylic acid. The reaction mixture is rapidly stirred and nitrogen is bubbled through the mixture. After salt-formation is completed, the reaction mixture is slowly heated to a higher temperature, at from 150°–235° C. while the water of amide-formation is driven off by more vigorous nitrogen flow. The reaction is continued by either method until the evolution of water slows down perceptibly or when the stoichiometric amount of water has been recovered. The resulting product is ready for use as a curing agent for epoxy resins.

In order to demonstrate the preparation of the aminoamides used in accordance with this invention and their utility as curing agents, the following examples are given, as taken from application Ser. No. 248,209.

*Example XII*

One hundred forty-six grams (1.0 mole) of triethylenetetramine (TETA) was charged to a resin pot equipped with a stirrer, a nitrogen bubbler inlet, a condenser mounted over a water trap, and a thermocouple well. The TETA in the pot was stirred and heated to 210° F. and maintained at 210°–220° F. while 257 g. (1.0 equivalent) of extract polybasic acid (EPA #49 in Table II) (as granules) was added slowly, in increments. When addition of reactants was complete, the temperature was raised to 285° F., with stirring. After all of the acid had been dissolved in the reaction mixture and salt formation had become complete, the temperature was raised to 295°–300° F., with stirring. At this point, water formation (foaming) indicated that formation of amide was in progress. The reaction temperature was raised slowly, with stirring, to approximately 500° F. When 18 g. (1 mole) of water had been collected in the trap, amide formation was considered to be complete and the preparation was terminated. The product, designated as Product A, was cooled and tested as an epoxy curing agent. Tests results are presented in Table XVIII below:

TABLE XVIII

[Epoxy resin used: Epon 830; 1/1 ratio of epoxy equivalents to active hydrogen in curing agent]

| Property | Curing Agent | | | |
|---|---|---|---|---|
| | Product A | Lancast A (Aminoamide of Tall Oil Acid) | Aromatic Amine Mixture (60/40 MPDA/MDA) | Triethylenetetramine |
| Compatibility with aromatic based epoxy resins. | Fast solubility, rapid blending. | Slow, needs vigorous stirring. | Slow, needs stirring. | Slow-needs vigorous stirring. |
| Curring speed: | | | | |
| Gelling time | 2 hrs | 8 hrs | 16 hrs | 2 hrs. |
| Hard cure time | 4 hrs | 15–20 hrs | 48 hrs | 4 hrs. |
| Heat Resistance (Soften at 110° C.). | Hard, inflexible | Very flexible | Hard, inflexible | |
| Barcol Hardness | 85–89 | 70–77 | 81–84 | |
| Tensile Strength, lbs./in.² | 7,050 | 5,950 | | |

NOTE.—Examination of the above test results shows our curing agents to be superior to the three commercial curing agents with which they were compared.

*Example XIII*

Another preparation was completed using the same sequential procedure described in Example XII. In this instance, the reactants were: 378.6 g. (2 moles) of tetraethylenepentamine and 514.6 g. (2 equivalents) of extract polybasic acid (EPA #49 in Table II). The product, designated Product B, was again a superior epoxy curing agent.

*Example XIV*

A 146.3 g. (1.0 mole) portion of triethylenetetramine was charged to a resin pot equipped as in Example VI. The TETA in the pot was heated to 210° F. and maintained at 210–220° F. as 233.7 g. (1.07 equivalents) of extract polybasic acid (EPA #53 in Tab. II) were added slowly in small increments. When addition of reactants had been completed, the temperature was raised to 285° F., with stirring. After all of the acid had dissolved in the reaction mixture and salt formation had become complete, the temperature was raised to 295–300° F., with stirring. At this point, water formation (foaming) indicated that amide formation was in progress. The reaction temperature was raised slowly, with stirring, to approximately 500° F. When 19.5 g. (1.07 moles) water had been collected in the trap, amide formation was considered to be complete and the preparation was terminated. The product, designated as Product C, was cooled to room temperature.

It should be noted that this preparation differed from the preparation described in Example XII in two important respects: (a) the extract polybasic acid was of higher acid number (256 against 218 in the case of Example XII); (b) there was a 1.07/1 ratio of acid equivalents/polyamine moles where there was a 1/1 ratio in Example XII. In Table XIX, below, it will be seen that Product C, used as a curing agent, results in a faster cure than is achieved with Product A.

TABLE XIX.—CURING TIMES USING A 10/12 EPOXY RESIN/ASPHALT MIXTURE

[Epoxy resin used: Epon 830; 1/1 ratio of epoxy equivalents to active hydrogen in curing agent]

| | Hours |
|---|---|
| Product A | 2 |
| Product C (2 experiments) | 1 and 1½ |

The foregoing experiments demonstrate the utility of the aminoamides as used herein as curing agents for epoxy resins.

THE EPOXY RESINS

The epoxy resins or resin intermediates to be treated in accordance with this invention are well-known and are widely used as adhesives, encapsulating compounds, laminates, structural forms and the like. The intermediates, or epoxy monomers, are cured, in accordance with this invention by using the aminoamides of the complex carboxylic acids just described in place of all or part of the known curing agents, such as polyamines, dibasic acids, polyamides and the like. Epoxy resins are expensive and are generally extended with other resins such as phenol-formaldehyde resins, aniline-formaldehyde resins, polyester resins, polyvinyl resins, urea-formaldehyde resins, melamine-formaldehyde resins, and the like.

The polyepoxy-resin intermediate used in preparing the compositions of this invention can be any of the broad class of polyepoxides known to be useful in preparing cured resins. In general, these polyepoxides are straight-chain polymers prepared from low-molecular-weight diepoxides and contain an epoxide group at each end of the chain. The epoxy resins contemplated by this invention include the newest class of these materials as prepared from monomers having two or more reactive epoxide groups in the monomer structure.

The epoxy monomers are available commercially, both in liquid and solid forms (the term "monomer" as used herein includes compositions which are strictly monomeric or which are partially polymerized or contain small amounts of polymers), and are polymerized by addition of curing agents which include primary, secondary, and tertiary amines, and polyfunctional compounds such as glycols, polyglycols, polyamines, polyamides, and carboxylic acid anhydrides. The resins which are prepared by curing epoxy-resin monomers are cross-linked resins of the thermosetting type, and are characterized by high chemical and thermal stability at high tensile and impact strength. The resins are prepared by addition to the epoxy monomer of a small amount of a curing agent. The curing agent is added to the epoxy resin in an amount which is effective for the particular resin to promote the hardening of the resin. The selection of the particular curing agent is determined by the characteristics of the epoxy resin composition and the proportion of the curing agent may vary widely, although the use of about 5–20% wt. of the curing agent is preferred.

Preferably, the polyepoxide used as the starting material is aromatic in chemical character.

Thermosetting synthetic resins formed by the polymerization of an ethylene oxide derivative containing at least two ethylene-oxide groups in the molecule, in the presence of inorganic or organic bases (as described in U.S. Patent 2,444,333), can be used in accordance with this invention. These resinous condensation products are prepared by the reaction between epihalohydrin, for instance epichlorohydrin,

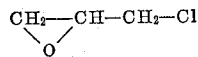

and bis-(4-hydroxyphenyl)dimethylmethane, commonly known as "Bis-phenol A," prepared by the condensation of 2 mols of phenol with 1 mol of acetone and having the formula,

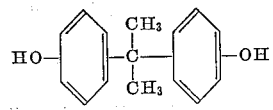

with or without an organic compound present corresponding to the general formula ZCNRNCZ, where R is a divalent organic radical free of functional groups other than the two NCZ groups and Z is a member selected from the class consisting of oxygen and sulfur.

The diphenol product is then reacted with epichlorohydrin in the presence of caustic to yield the diglycidyl ether in accordance with the equation:

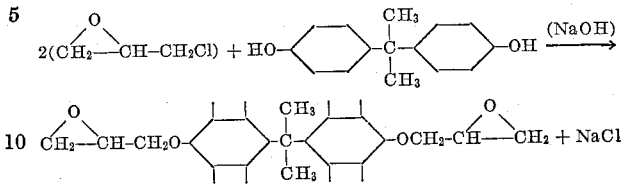

However, when the stoichiometric 2:1 ratio is employed, the yield of the monomeric diglycidyl ether is less than 10%, with the remaining material being higher-molecular-weight condensation and polymerization products. In order to obtain high yields of the monomeric product, excess epichlorohydrin is employed, the stoichiometric amount being doubled or tripled. It is then possible to obtain yields of 70% or more of the monomer. The epoxy "monomers" which are available commercially are generally mixtures containing varying amounts of the true monomer and other higher-molecular-weight condensation and polymerization products. The number of potentially useful reactants for the synthesis of epoxy resins is quite large. All varieties of polyhydric phenols, polyalcohols, polyfunctional halohydrins, and polyepoxides, have been suggested as intermediates in the literature. Many of these epoxy monomers which can be used in the preparation of epoxy resins are described in such text books as "Epoxy Resins," Skeist, Reinhold Publishing Corp., 1958, and "Epoxy Resins," Lee and Neville, McGraw-Hill Book Company, 1957. Compounds which are useful intermediates in the preparation of epoxy resins include diepoxides, such as butadiene diepoxide and divinylbenzene diepoxide, and diglycidyl ether,

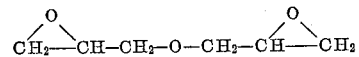

Other diglycidyl ethers include those produced by reaction of epichlorohydrin with other polyhydroxy compounds such as resorcinol, hydroquinone, pyrocatechol, saligenin, phloroglucinol, bisphenol F, trihydroxydiphenoldimethylmethane, fluor - 4 - dihydroxybiphenol, long-chain bisphenols, 4,4'-dihydroxydiphenol sulfone, novolac resins, ethylene glycol, and higher glycols, glycerol, erythritol, pentaerythritol, etc., in the presence of alkali. Glycidyl esters are also known to be useful intermediates (resin monomers) in the preparation of epoxy resins. Such esters include the diglycidyl ester of diphenolic acid, diglycidyl esters of phthalic acids (all three isomers), and diglycidyl esters of aliphatic dibasic acids, e.g., succinic acid, suberic acid, pimelic acid, etc. In the copending application of Walter E. Kramer and Louis A. Joo, Ser. No. 58,638, filed Sept. 27, 1960, the diepoxy esters of 4,4-tetrahydrodipyridyl dicarbamic acid (and analogs thereof), are disclosed as being novel epoxy resin monomers.

The resinous condensation products thus formed, which are prepared by one method in accordance with U.S. Patent 2,444,333 infra, are known as "Epon" resins which range from solids to viscous liquids having molecular weights in the order of about 1000 to 3000. In one form, this condensation reaction is carried out by employing a ratio of epihalohydrin to the bis-phenol at slightly below or around 2:1. Also, resinous products prepared in accordance with U.S. Patent 2,594,979 can be used.

The structure normally associated with epichlorohydrin bisphenol-A resins, used in accordance with this invention, is:

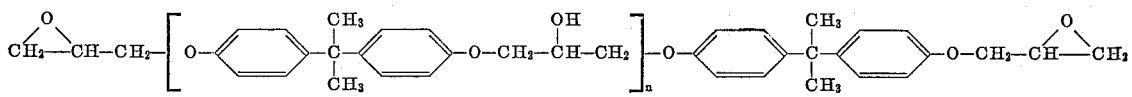

where $n$ has a value of 0 to 10 or more. This invention incorporates the extension or modification, of any resin formed by the reaction of an oxirane ring compound and compounds containing hydroxyl groups, the foregoing disclosure and formulae being illustrative. These resins are formed by the reaction of epichlorohydrin (B.P. 116° C.) or glycerol dichlorohydrin and a large variety of di- or polyhydroxyl compounds. Reactions occur through both the oxirane (epoxy) group and the halogen atom. In place of bisphenol-A such other compounds as glycerol, resorcinol, cresol, various glycols, catechol, hydroquinone, polyhydroxy naphthalenes, novolak-type phenolic resins, and other phenol derivatives may be used, all of which resins come within the scope of this invention.

Thirteen types of Epon (a registered trademark of Shell Chemical Co.) resins are known and available for formulation into cured coatings, adhesives, castings and laminates in accordance with this invention. All of these resins possess terminal epoxide groups and are known as epoxy-type resins. The primary difference among the various types of Epon resins is molecular weight, which increases as the identifying number increases. The aliphatic epoxy resins useful herein (e.g., Epon 812), have a chemical structure of a typical molecule as follows:

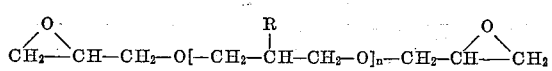

as exemplified by a glycerol-based resin (Epon 812) having a molecular weight of about 300. R in the formula is aliphatic and contains 1 to 20 carbon atoms.

All of the other members of the "Epon" series are aromatic in character, being obtained from mono and polyhydroxy aromatic compounds such as cresols, polyhydroxy naphthalenes and the like, i.e., R is aromatic or —CH$_2$— is replaced by a phenyl, naphthyl or anthryl groups in the formula for Epon 812. Other examples are Epoxide 201, a proprietary product of Union Carbide Chemicals Co., identified as 3,4-epoxy-6-methylcyclohexylmethyl-3,4-epoxy-6 - methyl - cyclohexane carboxylate. Also the product Oxiron 2001, proprietary product of Food Machinery and Chemical Co., having an epoxy equivalent of 145 as described in copending application Ser. No. 162,279 may be used.

Table XV gives the properties of illustrative polyepoxy monomers.

TABLE XX.—TYPICAL UNCURED EPOXY RESIN SPECIFICATIONS

| Epon Resin Type | Melting Point,[1] °C. | Color,[2] 25° C. (Gardner), max. | Viscosity,[2] 25° C. | | Epoxide Equivalent[3] |
|---|---|---|---|---|---|
| | | | Gardner-Holdt | Poises | |
| Epon 812 | Liquid | 3 | C-F | 0.9-1.5 | 140-160 |
| Epon 815 | Liquid | 5 | | 5-7 | 175-195 |
| Epon 820 | Liquid | 8 | | 40-100 | 180-195 |
| Epon 826 | Liquid | 5 | | 50-100 | 175-190 |
| Epon 828 | Liquid | 5 | | 100-160 | 180-195 |
| Epon 830 | Liquid | 12 | | 150-225 | 190-210 |
| Epon 834 | Liquid | 5 | O-V | 4.1-9.7 | 230-280 |
| Epon 836 | 40-45 | 5 | A$_1$-B | 0.3-0.7 | 280-350 |
| Epon 1001 | 65-75 | 4 | D-G | 1.0-1.7 | 425-550 |
| Epon 1002 | 75-85 | 4 | G-K | 1.7-3.0 | 550-700 |
| Epon 1004 | 95-105 | 4 | Q-U | 4.6-6.6 | 875-1,025 |
| Epon 1007 | 125-135 | 5 | Y-Z$_1$ | 18-28 | 2,000-2,500 |
| Epon 1009 | 145-155 | 5 | Z$_2$-Z$_5$ | 38-100 | 2,500-4,000 |

[1] Durrans' mercury method.
[2] Epon 812, 815, 820, 826, 828, and 830 on resin as supplied, Epon 834 on 70% wt. solution in butyl Carbitol; all other types on 40% wt. solution in butyl Carbitol at 25° C.
[3] Grams of resin containing one gram-equivalent of epoxide.

The uncured epoxy resins are generally liquids and of limited utility. They are accordingly further polymerized or "cured" by appropriate curing agents or catalysts which react with either the terminal epoxide groups or with the secondary hydroxyl groups or both to produce cross-linking or coupling, or esterification and polymerization reaction products of increased utility.

The aminoamides of copending application Ser. No. 248,209 used in accordance with this invention take the place of and are an improvement over the large number of known curing agents set forth in the prior art, e.g., in Table I of "Modern Plastics" Encyclopedia Issue, September 1951, pp. 108 and 109. The various reactions involved in curing the epoxy resins using the instant aminoamides in place of those of the prior art as set forth in the September 1960 issue of "Modern Plastics," Encyclopedia Issue, at pages 220 and 221 can be used.

THE PAVING COMPOSITIONS

The product of reacting these aminoamides with epoxy resins is known as a cured epoxy resin cross-linked by aminoamides and when prepared in a manner to incorporate a low-melting asphalt or asphalt oil becomes the paving composition of this invention. The general and preferred compositions are:

TABLE XXI.—PAVING COMPOSITIONS

| Ingredient | Composition (wt. Percent) | |
|---|---|---|
| | Preferred | General |
| Epoxy resin | 30-45 | 15-60 |
| Epoxy diluent | | 0-25 |
| Asphalt oil | 30-60 | 20-70 |
| Aminoamide curing agent | 15-30 | 10-35 |

The amount of curing agent is preferably such that a 10% to 15% excess of the stoichiometric requirements for the epoxy resin and diluent (when used) is present. The amount of aggregate used depends on the type of paving composition or top dress desired, and will vary in amounts from 0% to 90% by wt. based on the overall total composition.

In order to further illustrate the invention the following non-limiting examples of various combinations of complex acids derived from solvent extracts, fractions of said acids and various polyamines used to prepare aminoamides, and illustrative epoxy monomers to be cured thereby are given in Table XXII. Each of the aminoamide products shown in Table XXII illustrates a curing agent to be used in preparing the paving compositions of this invention. Each of the cured resins shown becomes a paving composition of this invention by the incorporation of the requisite amounts of asphalt or asphalt oil with or without aggregate.

mediate and the epoxide diluent, as well as aiding in the polymerization with the aminoamide curing agent. The reaction can be carried out using the amino catalyst alone without the epoxide diluent or the reaction can be carried out without using the amine catalyst.

After the polyepoxide intermediate (with or without the amine catalyst and with or without the epoxide diluent) has been contacted with the aminoamide curing agent and asphalt blend for a period of about 10 minutes the composition can be poured and spread into a layer

TABLE XXII

| No. | Complex Acid From— | Carboxyl Equivalents of Acid Used | Polyamine | Molar Amount of Polyamine | Epoxy Monomer Cured | Comments |
|---|---|---|---|---|---|---|
| 1 | Example I | 1.0 | DETA | 1.0 | | Aminoamide product. |
| 2 | Example II | 1.05 | TETA | 1.05 | | Do. |
| 3 | Example III | 1.0 | TETA | 1.0 | | Do. |
| 4 | No. 7 of Table II | 1.03 | Dipropylene triamine | 1.03 | | Do. |
| 5 | No. 3 of Table II | 1.05 | Cyclohexylenediamine | 1.05 | | Do. |
| 6 | No. 53 of Table II | 1.06 | Hexamethylenediamine | 1.06 | | Do. |
| 7 | Fraction No. 7, Table VII | 1.0 | TETA | 1.0 | Epon 830 | Cured resin. |
| 8 | Fraction No. 15, Table VIII | 1.04 | p-Phenylene | 1.04 | Epon 815 | Do. |
| 9 | Fraction No. 2, Table IX | 1.5 | Tetrapropylenepentamine | 1.5 | Epon 1009 | Do. |
| 10 | Fraction No. 5, Table X | 1.4 | TETA | 1.4 | Epon 812 | Do. |
| 11 | Fraction No. 3, Table XII | 2.3 | Butylene diamine | 2.3 | Epon 830 | Do. |
| 12 | Lower phase fraction of Table XVII | 1.0 | DETA | 1.0 | | Aminoamide product. |
| 13 | Lower phase fraction of Table XVIII | 1.05 | TETA | 1.06 | | Do. |
| 14 | Lower phase fraction of Table XVII | 1.0 | TETA | 1.0 | Epon 830 | Cured resin. |
| 15 | Lower phase fraction of Table XIX | 2.3 | Butylene diamine | 2.3 | Epon 812 | Do. |

The cured asphalt-epoxy paving compositions of this invention can be prepared using conventional techniques to prepare such materials by incorporating epoxy resins to impart adhesion, flexibility toughness and chemical resistance. The cured asphalt-epoxy compositions of this invention are highly cross-linked and exhibit high asphalt compatibility, easy handling and require no stabilizers. We have found that these aminoamides enhance the compatibility of asphalt with epoxy resins so greatly that asphalt/epoxy ratios as great as 2/1 can be used. This, of course, substantially reduces the cost of the compositions, permitting economical use in highways, etc., as well as in jet aircraft runways.

Our epoxy-asphalts are characterized by rapid and hard cure at ambient conditions, and firm adhesion to the aggregates (gravel, crushed stone, etc.) used in paving construction. When resistance to hydrocarbons is required, as in airport runways, a relatively thin layer of epoxy-asphalt, in which lower asphalt/epoxy ratios, up to about 1/1, are used, may be used as a sealing coat. These sealer epoxy-asphalt coats, based on the use of aminoamide curing agents, may also be used in finishing conventional asphalt pavings to impart a hard, solvent-resistant paving at relatively low cost.

In general, our epoxy-asphalts are prepared by blending an epoxy resin with asphalt (and with an epoxy diluent, if necessary) at a temperature within the range of 90°–180° F., then cooling the mixture to about 70°–85°, and rapidly blending in the required amount of aminoamide curing agent. This blend is applied immediately as paving and the aggregate, which is not necessarily used, but, in fact, is used in practically all cases, is added immediately and rolled or pressed into the epoxy-asphalt before it has set.

The relative amounts of the aminoamide-complex carboxylic acid curing agent, the polyepoxide resin intermediate and the epoxide diluent are selected so that the concentration of the reacting aminoamide carried into the final product is no greater than about 35% by weight. The lowest concentration of the reacting aminoamide curing agent in the end product which still retains the benefits of this invention is about 10% by weight. Higher and lower concentrations of the aminoamide curing agent incorporated are likely to result in slow setting of the pavement. The presence of the amine catalyst causes partial polymerization of the polyepoxide resin intersuitable for paving road surfaces. The paving mixture may contain 0% to 90% by wt. of various aggregates such as sand, gravel, crushed stone and the like.

In order to illustrate the paving compositions of the invention the following examples are given:

*Example XV*

Exactly 10.0 g. of asphalt oil (100° F. softening point) and 7.0 g. of Epon 828 were blended together by stirring at 90–100° F. for about 10 minutes. The blend was allowed to cool to room temperature, and 3.7 g. of Aminoamide A (Example XII) were added, with stirring. The resulting blend was poured into a flat shallow aluminum dish, forming a casting of epoxy-asphalt with ½ inch in thickness. The product solidified in 2 hours, at room temperature and was rock-hard after 16 hours. Properties of this product are reported in the table which follows the examples, below.

*Example XVI*

The procedure of Example XV is followed, except that 7.0 g. of Epon 830 is substituted for Epon 828, and 3.5 g. of Aminoamide A is used instead of 3.7 g. The product is an epoxy-asphalt paving with qualities very similar to the product of Example XV.

*Example XVII*

Exactly 7.0 g. of Epon 828 and 6.0 g. of asphalt oil (softening point, 100° F.) were blended together by stirring at 90–100° F. for about 10 minutes. The blend was allowed to cool to room temperature, and 3.7 g. of Aminoamide B (Example XIII) were added, with stirring. The resulting blend was poured into a shallow aluminum dish, forming a casting of epoxy-asphalt about ½ inch in thickness. The product solidified in 2 hours at room temperature and was rock-hard after 16 hours. It was of improved solvent resistance when compared to the product of Example XV. Properties of this product are reported in the table which follows the examples below.

*Example XVIII*

An epoxy asphalt was prepared by repeating the procedure of Example XVII. Immediately after the composition was poured into the aluminum dish, 85 g. of pea gravel were added and pressed into the still-soft epoxy asphalt. After curing, the aggregate-epoxy-asphalt was a firmly coherent, hard-surfaced mass that would have served as an excellent pavement for airports, etc.

Example XIX

The procedure of Example XVII is followed, except that 7.0 g. of Epon 830 is substituted for Epon 828, and 3.5 g. of Aminoamide B is used instead of 3.7 g. The product is an epoxy-asphalt paving with qualities very similar to the product of Example XVII.

Example XX

A paving suitable for runways used by jet aircraft is prepared as follows: The main bed (1–4 ft. deep) is prepared, using aggregate (crushed stone, gravel, etc.) and an epoxy-asphalt prepared in the manner of Example XV. The surface (2–6 inches in depth) is prepared with aggregate and the more solvent-resistant epoxy asphalt prepared as in Example XVII. The pavement so prepared is superior in its hardness and its resistance to solvents. It is economical because of the high asphalt content of the major part of its bed.

Example XXI

A low-cost, but superior, paving, suitable for highways, is prepared as follows: The main bed (1–4 ft. deep) is prepared of aggregate and paving asphalt. The paving is then surfaced and sealed with a layer (½ to 3 inches in depth) of aggregate and the hard, solvent resistant epoxy-asphalt of Example XVII.

The superior qualities of our novel epoxy asphalts are shown in the following table:

petroleum. The asphalts useful in the compositions of this invention may have the following general properties.

TABLE XXIV.—ASPHALT PROPERTIES

| Property: | Value |
|---|---|
| Softening point, R & B (° F.) | 190–350 |
| Sp. gr. (77°/77° F.) | 1.02–1.03 |
| Ductility | 2–4 |
| Penetration at 32° F. | 10–30 |
| Penetration at 77° F. | 30–40 |
| Penetration at 115° F. | 40–70 |
| Carbon tetrachloride solubles (wt. percent) | 99.0–100.0 |
| Ash as oxide (wt. percent) | .020–0.40 |

The embodiments of this invention in which an exclusive property or privilege is claimed are defined as follows:

1. An asphalt epoxy composition in accordance with claim 15 in which said complex carboxylic acids are prepared by the reaction of sulfur-containing aromatic compounds by metalation to form the alkali metal adduct, carbonation of said adduct to form the salt of the corresponding carboxylic acid and acidification of said salt to form the free acid.

2. An asphalt epoxy composition in accordance with claim 15 in which said sulfur-containing aromatic compound is a member of the group consisting of solvent extracts obtained in the solvent extraction of mineral lubricating oils using a solvent selective for aromatic compounds, hydrogenated solvent extracts, and recycle stock, decant oil from FCC processes and mixtures thereof.

TABLE XXIII.—EPOXY ASPHALTS

| | Our Blends from— | | Commercial Blends | | |
|---|---|---|---|---|---|
| | Example XV | Example XVII | (Coal-Tar-Epoxy) | (Coal-Tar-Epoxy) | Epoxy Asphalt |
| Proposed Applications | Paving Compound | Paving Compound | Floor Surfacing | Floor Surfacing | Jet Airport Paving Comp. |
| Ratio: Asphalt/Epoxy | 10/7 | 6/7 | 10/10 | 10/10 | |
| Type of Curing Agent | Aminoamide A | Aminoamide B | Diethylenetriamine | Amide | |
| Curing Speed | 2 hours | 2 hours | 2–8 hours | 4–10 hours | |
| Condition after Cure | Hard | Hard | | | |
| Resistance to Cold Flow under Pressure. | Excellent | Excellent | Moderate Cold Flow | Flexible, Cold Flow very noticeable. | Excellent. |
| Resistance to Heat | No deformation at 110° C. | No deformation at 110° C. | Will deform under heat. | Very flexible under heat. | Do. |
| Resistance to Jet Fuel and Gasoline Spillage. | Fair, but not complete resis. | Very Good Resistance. | | | Very good Resistance. |
| Compatibility in Blending Curing Agent with Asphalt and Epoxy. | Excellent, curing agent improves compatibility. | Excellent curing agent improves compatibility. | Fair | Poor | Special stabilizer comp. nec. to insure compatibility. |

It will be noted that our paving compounds have special advantages imparted by the novel curing agents: (1) ability to use higher asphalt contents, (2) fast curing rate, (3) good resistance to heat deformation, (4) good solvent resistance to jet fuel and gasoline, and (5) excellent blending compatibility.

Optionally an amine catalyst, e.g., a tertiary amine such as pyridine, $\alpha$-, $\beta$-, or $\gamma$-picoline, quinolines, quinaldine, trialkyl amines (trimethylamine, triethylamine, alkarylamines) methylphenylamine, alkyl-substituted aminophenols and other heterocyclic bases or other known catalysts, in amounts varying from about 0.2 to 1.5% by weight of the total charge, to cause partial polymerization of the polyepoxide intermediate and the epoxide diluent, as well as aiding in the polymerization and/or esterification with the aminoamide curing agent, can be used. The reaction to form the paving composition can be carried out using the amine catalyst alone without the epoxide diluent or the reaction can be carried out without using the amine catalyst.

The asphalt portion of the compositions of this invention may be naturally-occurring asphalt, paving asphalt, or asphalt derived as the bottoms from processing crude 3. An asphalt epoxy composition in accordance with claim 15 in which $x$ is 1.

4. An asphalt epoxy composition in accordance with claim 15 in which $x$ is 2.

5. An asphalt epoxy composition in accordance with claim 15 in which said epoxy monomer is the reaction product of a polyepoxy monomer, an amine catalyst and a hydroxy compound.

6. An asphalt epoxy composition in accordance with claim 15 in which the asphalt to glycidyl ether ratio is about 2 to 1.

7. The asphalt epoxy composition of claim 15 comprising about 10 parts of an asphalt oil, 7 parts of a liquid glycidyl ether of a polyhydric aromatic alcohol and about 4 parts of aminoamide curing agent.

8. An asphalt epoxy composition in accordance with claim 7 in which said glycidyl ether is the reaction product of epichlorohydrin and an aromatic hydroxyl compound.

9. An asphalt epoxy composition in accordance with claim 8 in which said hydroxyl compound is bisphenol-A.

10. An asphalt epoxy composition in accordance with claim 7 in which the polyamine is triethylenetetramine.

11. The asphalt epoxy paving composition of claim 15 containing about 6 parts of asphalt oil, about 7 parts of a liquid glycidyl ether of a polyhydric aromatic alcohol and about 4 parts of aminoamide curing agent.

12. An asphalt epoxy composition in accordance with claim 11 in which said glycidyl ether is the reaction product of epichlorohydrin and an aromatic hydroxyl compound.

13. An asphalt epoxy composition in accordance with claim 11 in which said hydroxyl compound is bisphenol-A.

14. An asphalt epoxy composition in accordance with claim 11 in which said polyamine is tetraethylenepentamine.

15. An asphalt epoxy composition comprising the cured reaction product of 20–70% by weight of an asphalt oil, 15–60% by weight of a liquid glycidyl ether of a polyhydric aromatic alcohol, and 10–30% by weight of a fluid aminomide of the formula:

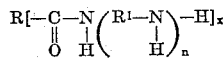

wherein $n$ is an integer of 1 to 10, $R^1$ is a divalent hydrocarbon radical containing 1 to 8 carbon atoms, $x$ has a value of 1 to 7 and R is a complex polynuclear aromatic and heterocyclic nucleus derived from carboxylic acids characterized by having an average molecular weight of about 320–750, containing about 1.05 to 4.5 weight percent of sulfur and containing an average of about 1.7 to 5.0 aromatic rings per mean aromatic molecule and an acid number of about 39–408.

16. An asphalt epoxy compsition comprising the cured reaction product of about 30–60% by weight of an asphalt oil, 30% to 45% by weight of a liquid glycidyl ether of a polyhydric aromatic alcohol, and 15% to 30% by weight of a fluid aminoamide of the formula:

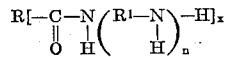

wherein $n$ is an integer of 1 to 10, $R^1$ is a divalent hydrocarbon radical containing 1 to 8 carbon atoms, $x$ has a value of 1 to 7 and R is a complex polynuclear aromatic and heterocyclic nucleus derived from carboxylic acids characterized by having an average molecular weight of about 320–750, containing about 1.05 to 4.5 weight percent of sulfur and containing an average of about 1.7 to 5.0 aromatic rings per mean aromatic molecule and an acid number of about 39–408.

17. The asphalt epoxy composition of claim 16 which contains up to 90% by weight of aggregate.

18. The asphalt epoxy composition of claim 15 in which the aminoamide has the formula:

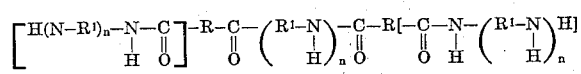

wherein $n$ is an integer of 1 to 10, $R^1$ is a divalent hydrocarbon radical containing 1 to 8 carbon atoms, and R is a complex polynuclear aromatic and heterocyclic nucleus derived from carboxylic acids characterized by having an average molecular weight of about 320–750, containing about 1.05 to 4.5 weight percent of sulfur and containing an average of about 1.7 to 5.0 aromatic rings per mean aromatic molecule and an acid number of about 39–408.

References Cited
UNITED STATES PATENTS

| | | | |
|---|---|---|---|
| 2,912,442 | 11/1959 | Webster | 260—47 |
| 3,012,487 | 12/1961 | Mika | 260—28 |
| 3,105,771 | 10/1963 | Simpson et al. | 117—32 |
| 3,222,280 | 12/1965 | Wolfram et al. | 260—47 |

MORRIS LIEBMAN, *Primary Examiner.*

J. E. CALLAGHAN, *Assistant Examiner.*